K. VON MEYENBURG.
SELF PROPELLED AGRICULTURAL IMPLEMENT FOR CULTIVATING, MOWING, GRINDING, AND THE LIKE.
APPLICATION FILED SEPT. 1, 1921.

1,428,194.

Patented Sept. 5, 1922.
2 SHEETS—SHEET 1.

Inventor:
Konrad von Meyenburg
By Lawrence Langner
Attorney

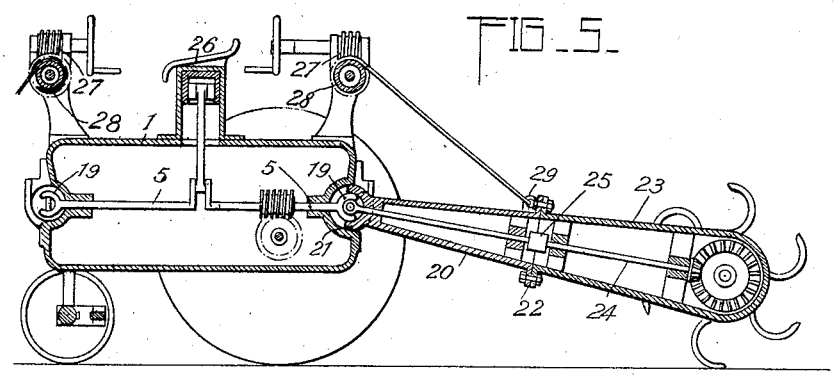
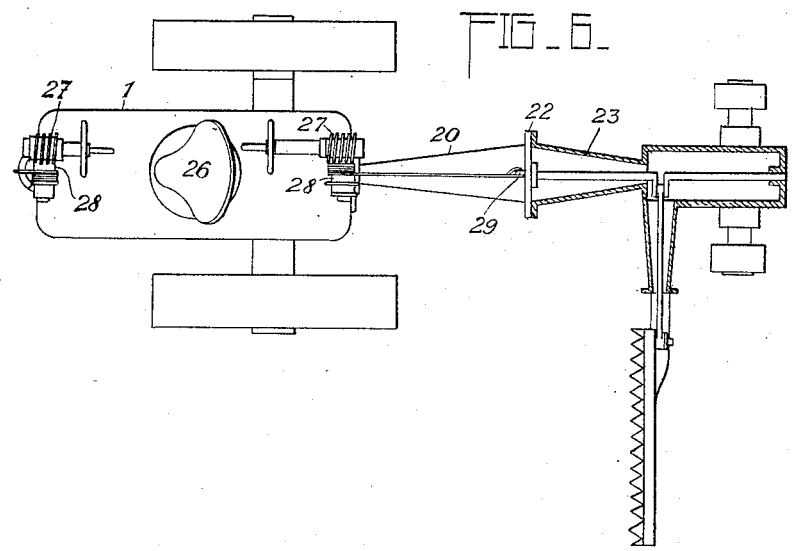
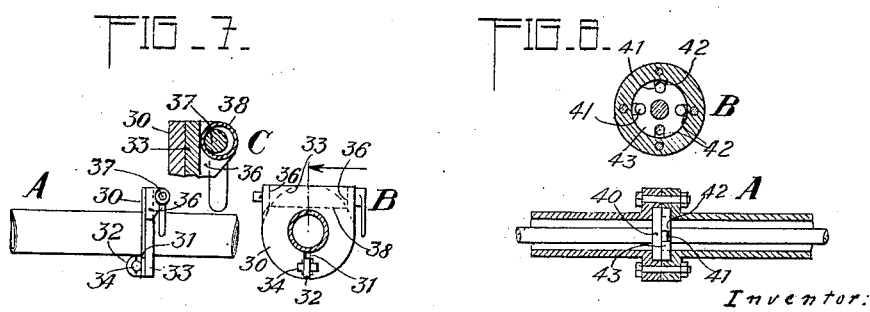
Inventor:
Konrad von Meyenburg
By Lawrence Langner
Attorney.

Patented Sept. 5, 1922.

1,428,194

UNITED STATES PATENT OFFICE.

KONRAD VON MEYENBURG, OF BASEL, SWITZERLAND.

SELF-PROPELLED AGRICUTURAL IMPLEMENT FOR CULTIVATING, MOWING, GRINDING, AND THE LIKE.

Application filed September 1, 1921. Serial No. 497,776.

*To all whom it may concern:*

Be it known that I, KONRAD VON MEYENBURG, a citizen of the Swiss Republic, and resident of Basel, Switzerland, engineer, have invented new and useful Improvements in Self-Propelled Agricultural Implements for Cultivating, Mowing, Grinding, and the like, of which the following is a full, clear, and exact specification.

This invention relates to a self-propelled agricultural implement having a tool driven by the motor. The invention consists in connecting the carriage frame of the implement, having the form of a gear casing, and the driving mechanism contained therein, respectively, with a support casing and an enclosed driving device for the tool, in such a manner that the tool may at any time be easily removed from the implement and replaced by another agricultural tool which is similarly coupled with the carriage frame and the driving mechanism to drive the tool. This construction permits the use with the same self-propelled motor vehicle of various agricultural tools, for instance cultivators, mowing tools, hay tossers and the like.

In the accompanying drawings there are shown diagrammatically several forms of the construction according to this invention.

Fig. 5 is a longitudinal section through a form having a cultivating tool and a driver's seat from which the tool may be raised or lowered.

Fig. 6 is a plan of a like construction carrying a mowing knife.

Fig. 7 shows at A a side view, at B partly a rear view, partly a section, and at C a section of a detail on a larger scale of a coupling device; Fig. 8 shows at A a longitudinal and at B a cross section of another coupling device.

Figure 1:
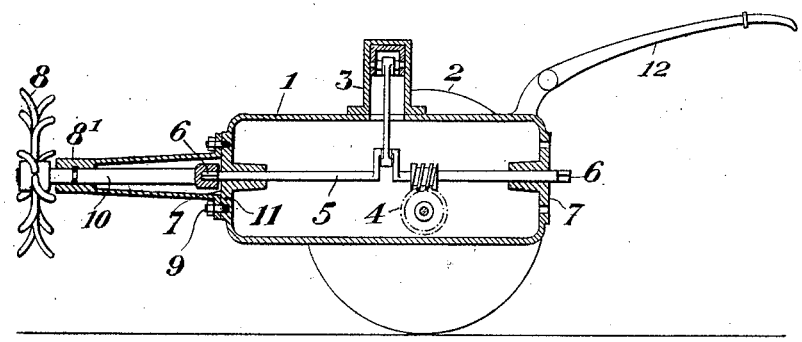
Fig. 1 is a longitudinal section of a form having a potato digger coupled at the front end and steering handles at the rear end.

In Fig. 1 the vehicle frame or body 1 is constructed as a gear case and is mounted on road wheels 2. The motor 3 drives the propelling gear 4. The driving shaft 5 extends forwardly and rearwardly outside the carriage body casing 1 and is squared or otherwise shaped at each end, as at 6, for coupling purposes.

The carriage body casing 1 has a faced surface 7 at each end for coupling purposes.

At the front end of the carriage body 1 a potato digger 8 is attached. For this purpose the shaft casing $8^1$ of the digger is fastened on the face 7 by means of screws 9 and the digger shaft 10 is connected with the shaft 5 by a socket 11 which fits the squared end 6 of the driving shaft, so that shaft 10 is driven by shaft 5.

At the rear end the body 1 is provided with steering handles 12 and by means of these the body can be turned on the axis of the wheels 2 to lower or raise the digger.

Figure 2:
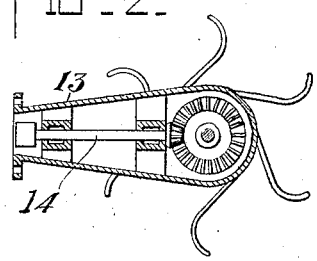

Fig. 2 shows a cultivating tool adapted to be attached by means of its casing 13 to the rear end of the body 1 shown in Fig. 1. The attachment is by means of screws to the rear face 7 and the driving shaft 14 has a socket for connection with the squared end 6 of the driving shaft 5 in the manner already described. In this case the machine can be steered at the front end of body 1 by means of a suitable steering device fitted thereto.

Figure 3:
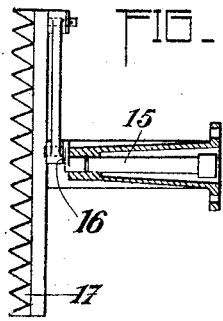
Figs. 2, 3 and 4 illustrate different types of tools.

Fig. 3 shows a mowing knife to be attached to the front end of the body 1 shown in Fig. 1. The driving shaft 15 of this tool moves the knife blade 17 to and fro by means of a crank 16.

Figure 4:
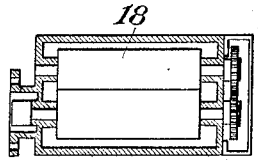

Fig. 4 shows grinding rollers to be attached to the rear end of the body 1 shown in Fig. 1. Of the two rollers 18 one is coupled by means of its shaft with the driving shaft 5. In this case the machine body may be jacked up to prevent the machine from running away.

In all these cases the casing of the tool is detachably secured to the face 7 of the body casing by means of screws and the shaft of the tool is coupled with the driving shaft 5 by a socket coupling.

In the form shown in Fig. 5, where the frame of the implement is supported at its front by one or two steering wheels, the two-part driving shaft 5, of which the parts are connected together by a joint 19, ends within a hollow arm 20 extending from the body 1 and connected therewith by a universal joint 21. This extending arm is connected at 22 with the casing 23 of a rotary cultivating tool by means of screws or bolts so that it can be disconnected. The driving shaft 24 of the tool is connected with that part of the shaft 5 which is contained in the arm 20 by means of socket connection 25. The tool can be raised and lowered from a driver's seat 26 by means of the gear 27 which drives the winding drum 28, the rope of which is connected with the arm 20 at 29.

The form shown in Fig. 6 is similar to that just described but instead of the cultivating tool a mowing tool is coupled to the arm 20 of the body 1. In this case the rear part of the mowing apparatus is supported by two trailing wheels as shown in the drawing.

Fig. 7 shows a coupling device suitable for connecting the casing of a tool with the arm extension 20. On one of the parts to be coupled there is a flange 30 having a slot 31 for passage of an eye 32 which is part of a flange 33 on the other part to be coupled. A bolt or pin 34 extending through the eye couples the two flanges. Diametrically opposite the said eye a pin 37 is inserted in two lateral eyes 36 of the flange 30 in which eyes the pin can be turned. On an eccentric part of this pin there is mounted a roller 38 such that when the pin 37 is turned by its handle, the two flanges are firmly brought together.

Fig. 8 shows an advantageous manner for connecting the main driving shaft with the driving shaft of the tool. One shaft carries a disc 40 having several pins 41 which engage in peripheral notches 42 of a disc 43 on the other shaft. Both discs rotate with bearing friction in the corresponding parts of the casing, wherein they are housed so as to be prevented from separating from one another.

I am aware that it has been proposed to provide a self propelled agricultural machine arranged for exchangably mounting and driving various tools, but in this arrangement neither the carriage frame nor the tool frame are constructed as gear-housings, nor were these frames rigidly coupled together, the essential feature of the invention being the construction by which the carriage body, on the one hand, constructed as a casing for housing the carriage and tool driving gears, and so that the tool can be raised or lowered, and the driving shaft therein, on the other hand, are coupled respectively with a support-casing and a driving mechanism of the tool, in such a manner that they are easily disconnected so that at any time the tool support-casing and the tool driving mechanism can be jointly removed from the implement and any agricultural tool can be mounted in its place jointly with its proper support-casing.

What I claim is:—

1. In a self-propelled agricultural implement, a carriage comprising a hollow carriage body, a driving motor on said carriage, a tool support-casing, a tool thereon, a tool actuating gear within said tool support-casing, a motor driven gear within said hollow carriage body for driving the carriage and the tool from the motor, means to allow raising or lowering of the tool and coupling means for rigidly and detachably connecting said tool support-casing and the tool actuating gear therein, respectively, with the said carriage body and the motor driven gear therein, substantially as and for the purpose described.

2. In a self-propelled agricultural implement, a carriage comprising a hollow carriage body, a driving motor on said carriage, a tool support casing, a tool thereon, a tool actuating gear within said tool support-casing, a motor driven gear within said hollow carriage body for driving the carriage and the tool, means to allow raising or lowering of the tool and coupling means both at the front and the rear part of the carriage body for detachably connecting said tool support-casing and the tool actuating gear therein, either on the front or the rear of the carriage, respectively with said carriage body and the motor driven gear therein, substantially as and for the purpose described.

In witness whereof I have hereunto signed my name this 17th day of August, 1921, in the presence of two subscribing witnesses.

KONRAD VON MEYENBURG.

Witnesses:
 FREIDA KURZ,
 ARMAND BAIN.